US010102392B2

(12) United States Patent
Koseki

(10) Patent No.: US 10,102,392 B2
(45) Date of Patent: Oct. 16, 2018

(54) DRIVE RECORDER, RECORDING METHOD OF DRIVE RECORDER, AND COMPUTER-READABLE MEDIUM

(71) Applicant: FUJITSU TEN LIMITED, Kobe-shi, Hyogo (JP)

(72) Inventor: Tomohisa Koseki, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 0 days.

(21) Appl. No.: 15/294,363

(22) Filed: Oct. 14, 2016

(65) Prior Publication Data

US 2017/0140166 A1 May 18, 2017

(30) Foreign Application Priority Data

Nov. 16, 2015 (JP) ................................. 2015-224322

(51) Int. Cl.
G06F 21/62 (2013.01)
G06F 21/31 (2013.01)
G07C 5/08 (2006.01)
G07C 5/00 (2006.01)

(52) U.S. Cl.
CPC .......... G06F 21/6218 (2013.01); G06F 21/31 (2013.01); G07C 5/008 (2013.01); G07C 5/0866 (2013.01)

(58) Field of Classification Search
CPC ...... G06F 21/6218; G06F 17/00; B60Q 11/00
See application file for complete search history.

(56) References Cited

U.S. PATENT DOCUMENTS

| 6,850,252 | B1* | 2/2005 | Hoffberg | G06K 9/00369 |
| | | | | 348/E7.061 |
| 9,324,201 | B2* | 4/2016 | Jun | G07C 5/0866 |
| 9,501,798 | B1* | 11/2016 | Urrutia | G06Q 40/08 |
| 2003/0191719 | A1* | 10/2003 | Ginter | G06F 21/10 |
| | | | | 705/54 |
| 2003/0212567 | A1* | 11/2003 | Shintani | G06Q 99/00 |
| | | | | 725/105 |
| 2009/0254971 | A1* | 10/2009 | Herz | G06Q 10/10 |
| | | | | 726/1 |
| 2010/0152976 | A1* | 6/2010 | White | A61B 5/117 |
| | | | | 701/48 |
| 2011/0304447 | A1* | 12/2011 | Marumoto | G07C 5/085 |
| | | | | 340/438 |
| 2014/0094987 | A1* | 4/2014 | Healey | B60R 25/00 |
| | | | | 701/1 |
| 2014/0309891 | A1* | 10/2014 | Ricci | H04W 4/21 |
| | | | | 701/48 |

(Continued)

FOREIGN PATENT DOCUMENTS

JP 2015-090519 A 5/2015

Primary Examiner — Alex C Dunn
(74) Attorney, Agent, or Firm — Oliff PLC

(57) ABSTRACT

A drive recorder according to an embodiment includes a capture unit and an access controller. The capture unit captures an outside of a vehicle. The access controller sets access limitation, which limits an access from a person other than an occupant of the vehicle, for traveling images of the vehicle. The traveling images are captured by the capture unit and stored in a storage medium. When an event arising from the vehicle meets a predetermined condition that indicates at least level of urgency, the access controller removes the access limitation.

5 Claims, 10 Drawing Sheets

(56) References Cited

U.S. PATENT DOCUMENTS

| | | | | |
|---|---|---|---|---|
| 2014/0324247 A1* | 10/2014 | Jun | ............ | G07C 5/0866 |
| | | | | 701/1 |
| 2016/0350298 A1* | 12/2016 | Ono | ............ | G06F 17/3028 |
| 2017/0138112 A1* | 5/2017 | Makke | ............ | B60R 1/00 |

* cited by examiner

FIG.4

| ID | PASSWORD | ADMINIS-TRATOR FLAG | QUASI-ADMINIS-TRATOR FLAG | |
|---|---|---|---|---|
| A | 1234 | 1 | 0 | |
| B | 5678 | 0 | 1 | |
| C | 9999 | 0 | 0 | |
| ⋮ | ⋮ | ⋮ | ⋮ | |

FIG.6

| IMAGE NUMBER | TIME | AUTHENTI-CATION ID | PW FLAG | PASSWORD |
|---|---|---|---|---|
| 1 | t1 | A | 0 | 1234 |
| ⋮ | ⋮ | ⋮ | 0 | ⋮ |
| 10 | t10 | B | 0 | 5678 |
| ⋮ | ⋮ | ⋮ | 0 | ⋮ |
| 19 | t19 | B | 0 | 5678 |
| 20 | t20 | B | 1 | ABSENCE |
| ⋮ | ⋮ | ⋮ | ⋮ | ⋮ |
| 30 | t30 | B | 1 | ABSENCE |
| ⋮ | ⋮ | ⋮ | ⋮ | ⋮ |
| 40 | t40 | B | 1 | ABSENCE |
| 41 | t41 | B | 0 | 5678 |
| ⋮ | ⋮ | ⋮ | ⋮ | ⋮ |

FIG.7

| EVENT | RECORD START | | PW PRESENCE/ ABSENCE | OVERWRITING PREVENTION | OTHERS |
|---|---|---|---|---|---|
| | AUTO-MATIC | MANUAL | | | |
| CONTINUOUS RECORD | ● | | PRESENCE | ABSENCE | |
| ACCIDENT IMPACT | ● | | ABSENCE | PRESENCE | |
| SUDDEN BRAKING | ● | | ABSENCE | PRESENCE | |
| SECURITY/SUSPICIOUS PERSON APPROACH | ● | | ABSENCE | PRESENCE | |
| SECURITY/VEHICLE BODY IMPACT | ● | | ABSENCE | PRESENCE | |
| AUTOMATIC-BREAK OPERATING TIME | ● | | ABSENCE | PRESENCE | |
| LANE DEPARTING TIME | ● | | ABSENCE | PRESENCE | |
| VEHICLE STICKING TIME | ● | | ABSENCE | PRESENCE | |
| DRIVE SCENERY | | ● | SELECTION | PRESENCE | |
| OTHER-VEHICLE DANGEROUS DRIVE | | ● | SELECTION | PRESENCE | |
| OTHER-VEHICLE TRAFFIC OFFENSE | | ● | SELECTION | PRESENCE | |
| OTHER-VEHICLE ACCIDENT | | ● | SELECTION | PRESENCE | |
| OTHER-VEHICLE RAPID APPROACH | ● | ● | SELECTION | PRESENCE | PW ABSENCE IN AUTOMATIC |
| PEDESTRIAN RAPID APPROACH | ● | ● | SELECTION | PRESENCE | PW ABSENCE IN AUTOMATIC |
| FALLEN/FLYING OBJECT | ● | ● | SELECTION | PRESENCE | PW ABSENCE IN AUTOMATIC |

FIG.8A

| | | READABLE TRAVELING INFORMATION | | |
|---|---|---|---|---|
| | | A | B | C |
| AUTHENTI-CATION PERSON | A | ● | ● | ● |
| | B | | ● | ● |
| | C | | | ● |

FIG.8B

| | | DELETABLE TRAVELING INFORMATION | | |
|---|---|---|---|---|
| | | A | B | C |
| AUTHENTI-CATION PERSON | A | ● | ● | ● |
| | B | | | |
| | C | | | |

FIG.8C

| | | DATA-TRANSFERABLE TRAVELING INFORMATION | | |
|---|---|---|---|---|
| | | A | B | C |
| AUTHENTI-CATION PERSON | A | ● | ● | ● |
| | B | | ● | |
| | C | | | ● |

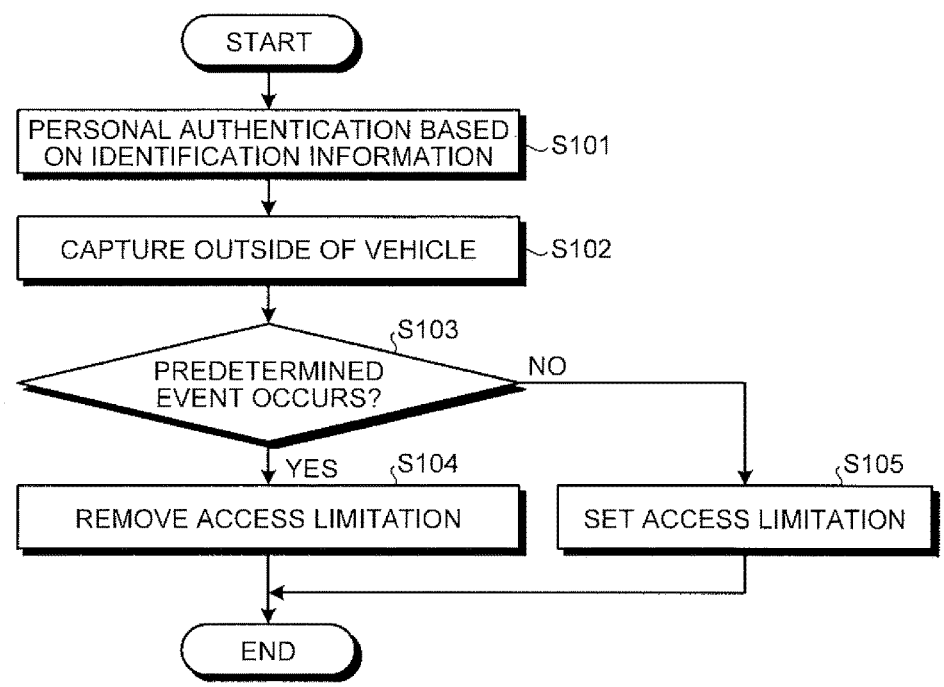

DRIVE RECORDER, RECORDING METHOD OF DRIVE RECORDER, AND COMPUTER-READABLE MEDIUM

CROSS-REFERENCE TO RELATED APPLICATION

This application is based upon and claims the benefit of priority of the prior Japanese Patent Application No. 2015-224322, filed on Nov. 16, 2015, the entire contents of which are incorporated herein by reference.

FIELD

The embodiment discussed herein is directed to a drive recorder, a recording method of the drive recorder, and a computer-readable medium.

BACKGROUND

Conventionally, there is known a drive recorder that is mounted on a vehicle to record, as traveling information, traveling images obtained by capturing the outside of the vehicle. For example, in such a case that the vehicle causes a collision accident, the traveling information recorded in the drive recorder is used as information that objectively indicates a situation at the time of the accident.

With regard to the drive recorder, there is proposed a technology of personal information protection, in which an authentication code for each occupant is set with respect to the recorded traveling information, thereby leading to prevention of unauthorized readout of the traveling information by other persons (for example, see Japanese Laid-open Patent Publication No. 2015-090519).

However, because the aforementioned conventional technology sets an access right to stored traveling information for each occupant, high-urgency traveling images of a collision accident, etc. may not be read by a person other than the occupants.

SUMMARY

A drive recorder according to an embodiment includes a capture unit and an access controller. The capture unit captures an outside of a vehicle. The access controller sets access limitation, which limits an access from a person other than an occupant of the vehicle, for traveling images of the vehicle. The traveling images are captured by the capture unit and stored in a storage medium. When an event arising from the vehicle meets a predetermined condition that indicates at least level of urgency, the access controller removes the access limitation.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 4 is a diagram illustrating identification information;

FIG. 6 is a diagram illustrating traveling information;

FIG. 7 is a diagram illustrating event information;

FIGS. 8A to 8C are diagrams illustrating administrator authority;

FIG. 9 is a flowchart illustrating a procedure for recording processes that are executed by the drive recorder according to the embodiment.

DESCRIPTION OF EMBODIMENT

Hereinafter, an exemplary embodiment of a drive recorder, a storage method of the drive recorder, and a computer-readable medium according to the present application will be described in detail with reference to the accompanying drawings. It is not intended that the drive recorder, the storage method of the drive recorder, and the computer-readable medium according to this application be limited to the embodiment described below.

Outline of Recording Method of Drive Recorder

Figure 1:
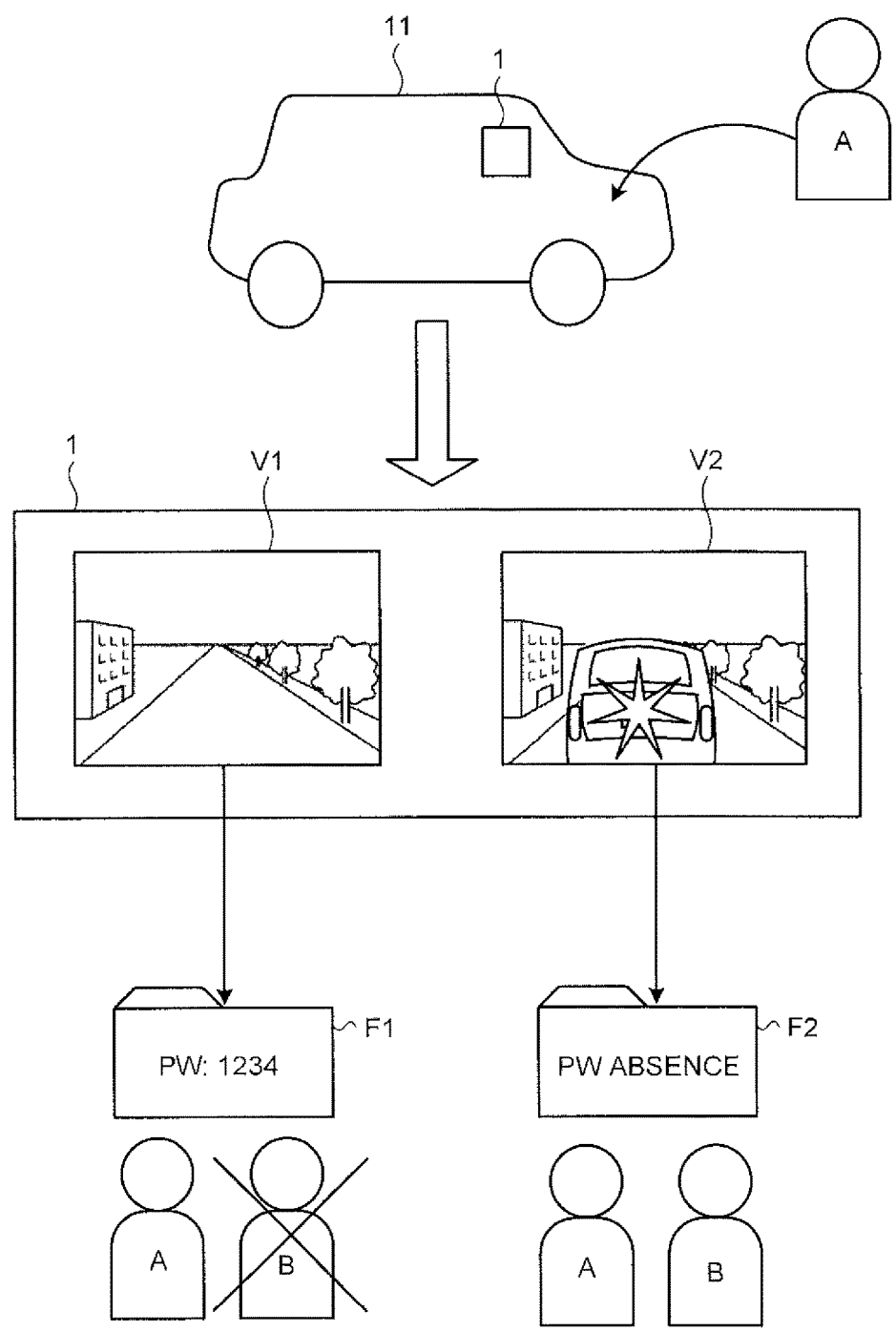
FIG. 1 is a diagram illustrating an outline of a recording method of a drive recorder according to an embodiment.

FIG. 1 is a diagram illustrating an outline of a recording method of a drive recorder according to an embodiment. The recording method of the drive recorder according to the present embodiment is executed by, for example, a drive recorder 1 that is mounted on a vehicle 11.

In FIG. 1, the case in which an occupant A is getting in the vehicle 11 is illustrated. The occupant A is, for example, a driver of the vehicle 11, however, is not limited thereto, the occupant A may be an occupant that sits in a front passenger seat or a back passenger seat of the vehicle 11.

In the recording method of the drive recorder 1 according to the present embodiment, an access right to traveling images, in which outside of the vehicle 11 is captured, is given to the occupant A of the vehicle 11 while setting access limitation that limits an access from a person other than the occupant A. Moreover, the access limitation is removed when a predetermined event such as a collision accident of the vehicle 11 occurs.

Specifically, as illustrated in FIG. 1, the drive recorder 1 firstly captures outside of the vehicle 11 at a predetermined frame rate (number of processing frames per unit time) using an capture unit (not illustrated) provided on the drive recorder 1 itself, the vehicle 11, etc. Access limitation that limits an access from a person other than the occupant A is set for, for example, traveling images V1 captured by the capture unit, and the traveling images V1 is recorded, as traveling information F1, in a storage medium.

The traveling information F1 includes identification information that identifies the occupant A. The identification information includes, for example, an identification (ID) that identifies the occupant A, a password (example in FIG. 1: "1234") that allows access to the traveling information F1, information on an administrator that has administrator authority, etc.

In other words, the drive recorder 1 gives the password to the traveling images V1, and thus records the traveling information F1 that limits an access from a person other than the occupant A. Therefore, because another person (example in FIG. 1: reader B) that does not know the password of the occupant A cannot read the traveling images V1 in such a case that the occupant A gets in the vehicle 11, personal information on occupant A is protected.

The access limitation is not limited to a password, and fingerprint authentication may be also employed, which matches a fingerprint accepted from the occupant A and fingerprint information by involving, for example, the fingerprint information on the occupant A in the identification information.

On the other hand, in such a case that, for example, the vehicle 11 causes the collision accident with another vehicle, if access limitation is set, which limits an access to traveling images V2 of the collision accident from a person other than the occupant A, a reader B of such as the police or an insurance company cannot read the traveling images V2 in which a situation of the collision accident is captured, and thus a cause of the accident may not be analyzed precisely.

Therefore, in the recording method of the drive recorder 1 according to the present embodiment, when an event arising from the vehicle 11 meets a predetermined condition that indicates at least level of urgency, traveling information F2, from which the access limitation from a person other than the occupant A is removed, is recorded.

As a result, by employing the recording method of the drive recorder 1 according to the present embodiment, a person other than the occupant A can also read traveling images with respect to those of high urgency while protecting personal information on the occupant A with respect to, for example, traveling images of low urgency. In other words, because the reader B of such as the police or an insurance company can read the traveling images V2 of a collision accident, which is recorded in the traveling information F2, a cause of the accident can be precisely analyzed.

Summary of Display System

Figure 2:
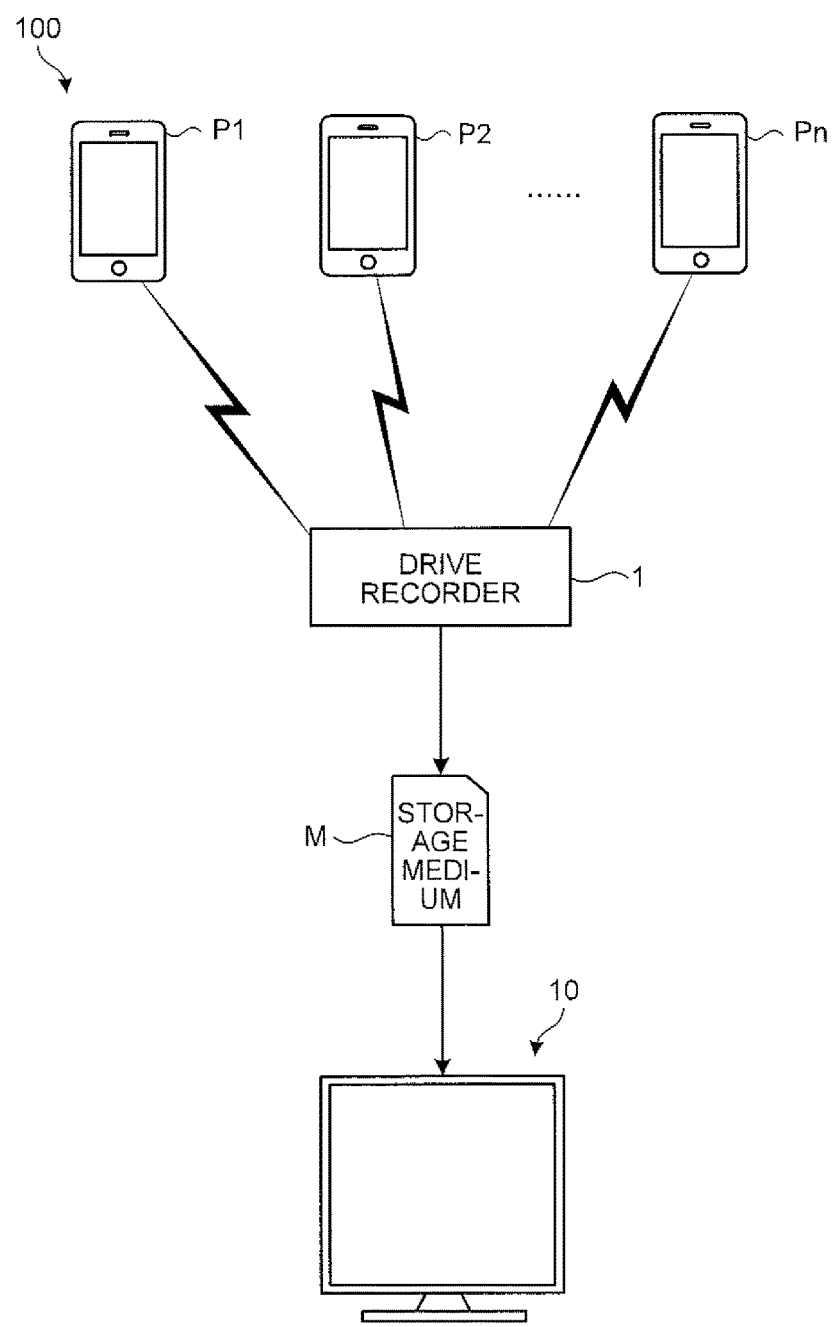
FIG. 2 is a diagram illustrating an outline of a display system according to the embodiment.

Next, a display system 100 will be explained with reference to FIG. 2, which includes the drive recorder 1 that is explained with reference to FIG. 1. FIG. 2 is a diagram illustrating an outline of the display system 100 according to the present embodiment. As illustrated in FIG. 2, the display system 100 according to the present embodiment includes portable devices P1 to Pn, the drive recorder 1, and a display device 10. Hereinafter, the portable devices P1 to Pn may be collectively referred to as "portable device(s) P".

The portable device P is a portable electronic device such as a cell-phone or a smartphone, which is owned by, for example, an occupant of the vehicle 11. The portable device P is not limited to a cell-phone or a smartphone. It is sufficient that the portable device P can identify an occupant, and may be, for example, an electronic key that unlocks doors or controls engine starting of the vehicle 11.

The portable device P is communicatively connected to the drive recorder 1. For example, the portable device P and the drive recorder 1 execute wireless communication, and further send and receive with each other the identification information, an authentication request, an authentication result, etc. For example, a near-field communication standard for digital devices such as Bluetooth (Registered Trademark) or Wi-Fi (Registered Trademark) is used in the wireless communication.

The drive recorder 1 includes a capture unit (not illustrated). The drive recorder 1 is provided at a position from which outside of the vehicle 11 can be captured by the capture unit, for example, on a surface of a front window in the interior of the vehicle so that a capturing direction of the capture unit is toward forward areas of the vehicle 11.

The drive recorder 1 may be provided at an arbitrary position from which outside of the vehicle 11 can be captured, for example, on a rear window, a ceiling in the interior of a vehicle, a dashboard, etc. other than the front window of the vehicle 11. Moreover, a configuration may be also employed, in which the capture unit is provided separately from the drive recorder 1 and at an arbitrary position of the vehicle 11 depending on the capturing direction.

Also, to the drive recorder 1, a portable storage medium M (for example, Secure Digital card (SD card), etc.) is detachable. The storage medium M records the traveling information that includes the traveling images for which the access limitation is set.

However, the storage medium M is not limited to a portable storage medium, and may be, for example, a Hard Disk Drive (HDD) built in the drive recorder 1, or a server apparatus in the cloud computing.

The display device 10 includes, for example, a screen, and causes the screen to display the traveling images recorded in the storage medium M. The display device 10 includes an input unit (not illustrated) to which a password, etc., which is set in the traveling information, is input. Moreover, with respect to the display device 10, the portable device P may double as functions of the display device 10.

Block Diagram of Display System

Figure 3:
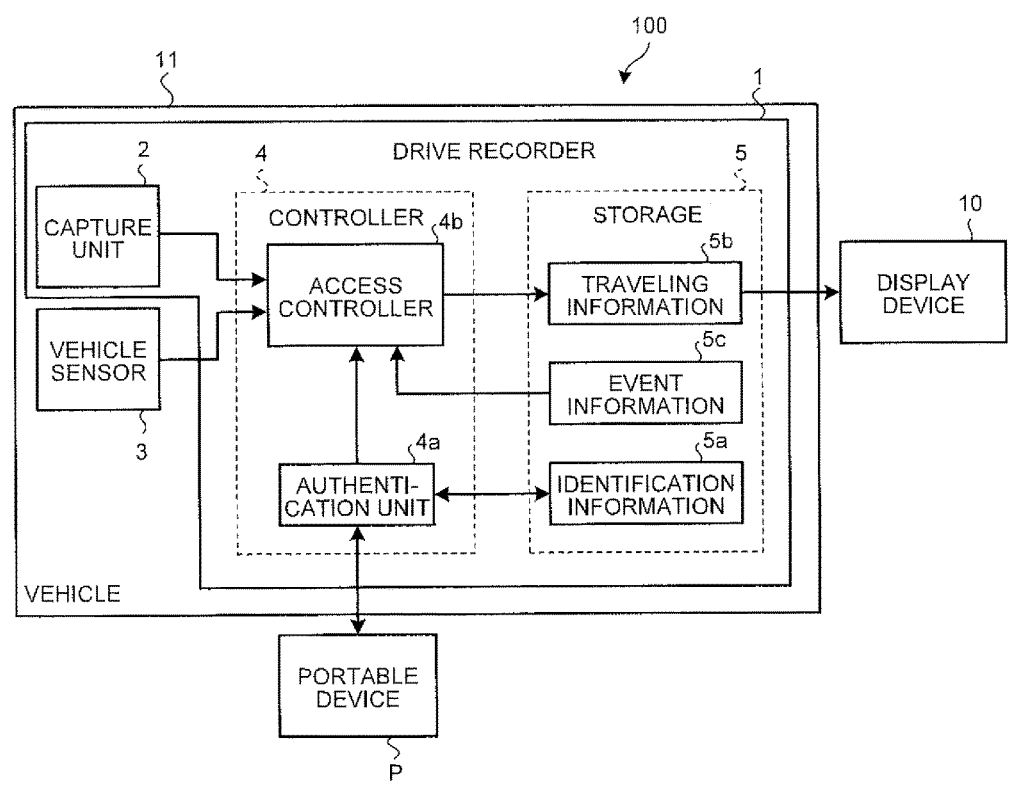
FIG. 3 is a block diagram illustrating a configuration of the display system according to the embodiment.

A configuration of the display system 100 will be explained more specifically with reference to FIG. 3. FIG. 3 is a block diagram illustrating a configuration of the display system 100 according to the present embodiment.

Portable Device

The portable device P sends to the drive recorder 1 identification information that identifies the occupant A to execute initial setting for registration of the occupant A as an authentication target person. In the initial setting, the occupant A sets, for example, respective arbitrary character strings, by which the occupant A can be identified, as an ID and a password of the identification information.

When the occupant A whose initial setting is completed gets in the vehicle 11, the portable device P sends to the drive recorder 1 an authentication request that executes personal authentication of the occupant A. In the authentication request, for example, the ID and the password registered in the initial setting are sent to request the authentication. When the drive recorder 1 authenticates the sent ID and password of the occupant A, the portable device P receives the result of the authentication from the drive recorder 1.

Vehicle

The vehicle 11 includes the drive recorder 1 and a vehicle sensor 3. First, the vehicle sensor 3 will be explained. The vehicle sensor 3 is a sensor that detects states regarding traveling of the vehicle 11.

The vehicle sensor 3 is, for example, an acceleration sensor that detects acceleration of the vehicle 11, a sensor that detects the distance between the vehicle 11 and other vehicles by, for example, a millimeter-wave radar that radiates electrical waves, a security sensor that detects, for example, the theft of the vehicle 11, and the like. The vehicle sensor 3 outputs to the drive recorder 1 a detection result that indicates the state of the vehicle 11.

Drive Recorder

The drive recorder 1 includes a capture unit 2, a controller 4, and a storage 5. The controller 4 includes an authentication unit 4a and an access controller 4b.

The capture unit 2 includes a capture element such as a Charge Coupled Device (CCD) or a Complementary Metal Oxide Semiconductor (CMOS). The capture unit 2 outputs to the controller 4, as traveling images, captured images of outside the vehicle 11, which are captured by the capture element at a predetermined frame rate (for example, 30 fps).

The controller 4 is a microcomputer that includes, for example, a Central Processing Unit (CPU) and a Read Only Memory (ROM). The CPU functions as the aforementioned authentication unit 4a and access controller 4b by, for example, executing an operation process in accordance with programs previously stored in the ROM.

Authentication Unit

The authentication unit 4a stores, in the storage 5, identification information 5a that includes an ID and a password that identify the occupant A, which are sent from the portable device P in initial setting. When the occupant A gets in the vehicle 11, the authentication unit 4a receives an authentication request from the portable device P, and executes personal authentication of the occupant A on the basis of the ID and the password that identify the occupant A.

Specifically, the authentication unit 4a determines whether or not the ID and the password that are sent from the portable device P equate to an ID and a password of the identification information 5a stored in the storage 5. When the IDs and the passwords equate to each other, the authentication unit 4a authenticates the occupant A, and sends to the portable device P an authentication result that indicates the fact that the authentication has done.

The identification information 5a, which is stored by the authentication unit 4a, will be here explained with reference to FIG. 4. FIG. 4 is a diagram illustrating the identification information 5a. Moreover, the identification information 5a illustrated in FIG. 4 is an example, and is not limited thereto.

As illustrated in FIG. 4, the identification information 5a is information that includes items such as "ID", "password", "administrator flag" and "quasi-administrator flag". "ID" is information that identifies an occupant that gets in the vehicle 11, and is, for example, a user name. "Password" is a password that allows an access, and includes, for example, arbitrary four digits.

"Administrator flag" and "quasi-administrator flag" are information that indicate, by either value of "0" or "1", whether the occupant is an administrator that can perform privileged functions about processes for traveling information or a quasi-administrator that is equivalent to thereof. In other words, when an authentication target person is registered as an administrator or a quasi-administrator, corresponding "administrator flag" or "quasi-administrator flag" becomes "1". The administrator and the quasi-administrator will be explained later with reference to FIGS. 8A to 8C.

As illustrated in FIG. 4, a plurality of the authentication persons are registered in the identification information 5a. For example, the identification information 5a indicates that one vehicle 11 can be shared by a plurality of the authentication persons when the vehicle 11 is a rental car, a company car, etc. In other words, each authentication person limits an access form a person other than the corresponding authentication person by setting a password.

Return to FIG. 3, the explanation of the authentication unit 4a will be continued. When authenticating the occupant A, the authentication unit 4a sends an authentication result to the portable device 2, and outputs information on the occupant A included in the identification information 5a to the access controller 4b.

Access Controller

The access controller 4b, on the basis of information on the occupant A acquired from the authentication unit 4a, gives the occupant A an access right to traveling images that are input from the capture unit 2, and sets access limitation that limits an access to them from a person other than the occupant A. Specifically, the access controller 4b gives the traveling images the password of the occupant A acquired from the authentication unit 4a, and thus sets the access limitation. Moreover, the access controller 4b removes the access limitation to the traveling images by removing the password of the traveling images, or keeping the password from being given to the traveling images.

Figure 5:
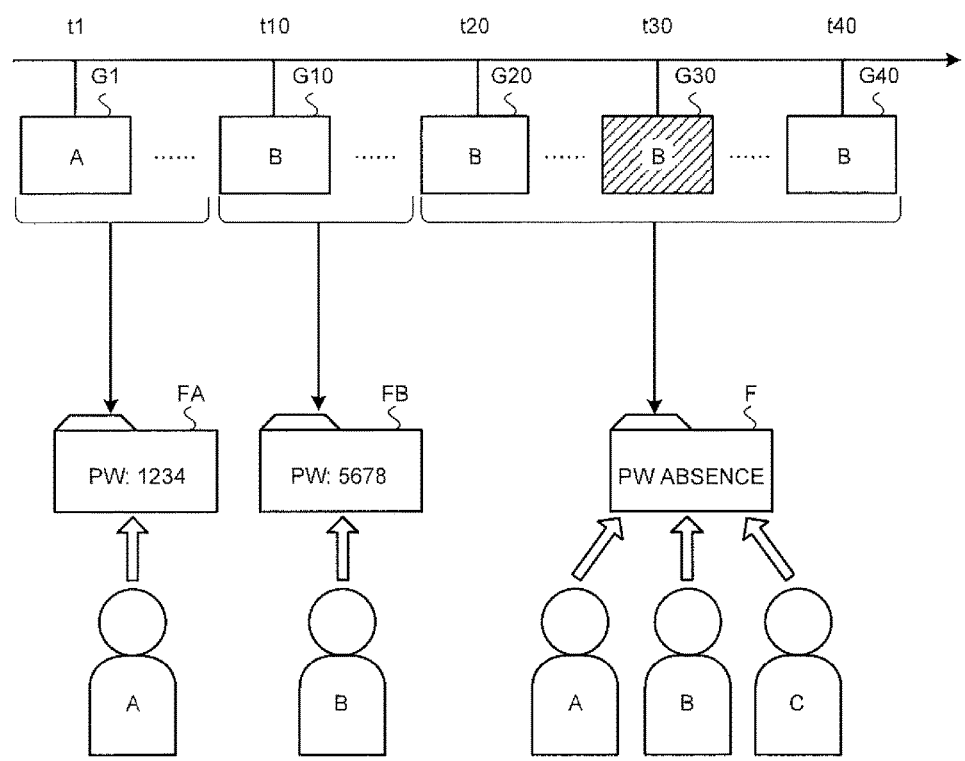
FIG. 5 is a diagram illustrating processes for access limitation setting.

Processes for the access limitation setting will be here explained with reference to FIG. 5. FIG. 5 is a diagram illustrating processes for the access limitation setting. As illustrated in FIG. 5, the drive recorder 1 according to the present embodiment employs, for example, a continuous-record method in which captured images G, which are input from the capture unit 2, are sequentially recorded.

In the method, the access controller 4b sets the access limitation for each of captured images that are sequentially input from the capture unit 2. Specifically, when a captured image G1 is captured at time t1 in which the occupant A is authenticated, the access controller 4b gives the captured image G1 a password (for example, "1234") that is corresponding to an ID of the occupant A.

Moreover, when the occupant A gets off the vehicle 11, in other words, communication between the portable device P of the occupant A and the drive recorder 1 ceases, the access controller 4b removes the authentication of the occupant A, and does not give the password that is corresponding to the ID of the occupant A to captured images after the removal of the authentication.

The access controller 4b stores each captured image, to which the password that is corresponding to the ID of the occupant A is given, in, for example, a folder FA that stores traveling information on the occupant A. In other words, the password that is corresponding to the ID of the occupant A is needed in order to read the traveling images to be stored in the folder FA.

When a captured image G10 is captured at time t10 in which the occupant B is authenticated, the access controller 4b gives the captured image G10 a password (for example, "5678") that is corresponding to an ID of the occupant B.

The access controller 4b stores each captured image, to which the password that is corresponding to the ID of the occupant B is given, in, for example, a folder FB that stores traveling information on the occupant B. In other words, the password that is corresponding to the ID of the occupant B is needed in order to read the traveling images to be stored in the folder FB.

Therefore, when the occupants A and B share the vehicle 11, a password, which is corresponding to each occupant, is set for each of the traveling images, and thus an unauthorized access from a person other than the corresponding occupant is limited.

When, for example, the occupant B drives the vehicle 11 and causes a collision accident at time t30, the access controller 4b removes access limitation that limits an access from a person other than the occupant B from traveling images during a predetermined time, which include a captured image G30 captured in the time t30.

Specifically, the access controller 4b removes passwords given to each captured image during a passed time from the time t20 to the time t30. Moreover, the access controller 4b keeps each of the captured images during a future time from the time t30 to time t40 from being given a password.

Therefore, a person (for example, unauthenticated occupant A or reader C) other than the occupant B of an authentication person can read traveling images during a time including the collision accident at the time t30.

The access controller 4b stores in, for example, the folder F each of the captured images for which a password is not set. In other words, because the password, by which the traveling images stored in the folder F are read, is not needed, anyone can read the traveling images.

Next, a traveling information 5b to be stored in the storage 5 will be explained with reference to FIG. 6. FIG. 6 is a diagram illustrating the traveling information 5b. The traveling information 5b illustrated in FIG. 6 is an example, and is not limited thereto.

As illustrated in FIG. 6, the traveling information 5b is information that includes items such as "image number", "time", "authentication ID", "PW flag" and "password". "Image number" is an identification ID of a captured image, and, for example, numbering information that is given to each of the captured images. "Time" is the time at which a captured image is captured. "Authentication ID" is an ID of an authenticated occupant at the corresponding time.

"PW flag" is information that indicates, by either value of "0" or "1", whether or not a password is given to the captured image. When an event arising from the vehicle 11 meets a predetermined condition that indicates at least level of urgency, "1", which indicates that the password is not given, is stored in "PW flag", otherwise "0" is stored. "Password" is a password that is corresponding to an occupant of the authentication ID.

For example, when a collision accident occurs at the time t30, by setting "1" to the PW flag from the time t20 to the time t40, a password is not given to the captured images of corresponding "image number".

Moreover, when deciding whether or not to give a password, the access controller 4b determines whether or not a high-urgent event arises from the vehicle 11. Specifically, the access controller 4b determines which of events in event information 5c including a high-urgent event arises on the basis of a detection result input from the vehicle sensor 3.

The event information 5c will be here explained with reference to FIG. 7. FIG. 7 is a diagram illustrating the event information 5c. The event information 5c illustrated in FIG. 7 is previously stored in the storage 5. The event information 5c illustrated in FIG. 7 is an example, and is not limited thereto. The event information 5c indicates information on setting regarding each of various events that are assumed to occur on the vehicle 11. The events that are assumed to occur on the vehicle 11 include a high urgent event and a low urgent event.

As illustrated in FIG. 7, the event information includes items such as "event", "record start", "PW presence/absence", "overwriting prevention" and "others". "Event" indicates a pattern of an event that may occur at the periphery of the vehicle 11.

"Recording start" indicates a method by which recording of the traveling information 5b starts, and falls into "automatic" and "manual". "Automatic" indicates that the traveling information 5b is recorded regardless of will of an authentication person. "Manual" indicates that the traveling information 5b is recorded when a predetermined operation from an authentication person is accepted.

"PW presence/absence" indicates whether or not a password is given to the traveling information 5b to be recorded. An event whose "PW presence/absence" is "absence" indicates that a password to the traveling information 5b is removed. Ordinarily, "PW presence/absence" is "absence" in the case of a high urgent event. In the case of a particular event whose "PW presence/absence" is "selection", an operation from an occupant, which selects one of giving and removal of a password to/from the traveling information 5b, is accepted, and the giving and the removal (setting and removal of access limitation) of the password are switched in accordance with the operation. "Overwriting prevention" indicates that, when excessive amount of data of the recorded traveling information 5b causes lack of storage capacity of the storage 5, whether or not the storage 5 can be overwritten to record the new traveling information 5b, in other words, whether or not the old traveling information 5b is deleted. "Others" indicates other collateral information.

The drive recorder 1 according to the present embodiment employs a continuous-record method in which all of the captured traveling images are recorded ordinarily. In other words, the access controller 4b sets "continuous record" illustrated in FIG. 7 to an ordinary pattern, and further sets "presence" to "PW presence/absence" with respect to "continuous record", in other words, gives a password to the traveling information 5b to be recorded.

In the case of "continuous record", the access controller 4b sets, in accordance with "absence" in "overwriting prevention", the traveling information 5b to be recorded so that the old traveling information 5b is rewritten by the new traveling information 5b. Therefore, the drive recorder 1 can effectively use the recording capacity of the storage 5.

Next, the case in which an event is an "accident impact" will be explained as an example. When, for example, the vehicle 11 collides against another vehicle, and an acceleration sensor of the vehicle sensor 3 detects the acceleration of a predetermined threshold or more, the access controller 4b determines that "accident impact" occurs as an event.

In such a case, the access controller 4b removes a password of the traveling information 5b to be recorded in accordance with information corresponding to "accident impact" in the event information 5c, for example, "absence" in "PW presence/absence". Moreover, the access controller 4b keeps the traveling information 5b to be recorded from being rewritten in accordance with, for example, "presence" in "overwriting prevention".

Therefore, in the drive recorder 1 according to the present embodiment, a reader of such as the police or an insurance company can read the traveling information 5b, in which the collision accident is captured, in such a case that a collision accident occurs. Therefore, a cause of the accident can be precisely analyzed.

A determination condition when an event is "sudden braking" is, for example, a case in which the acceleration in the forward direction, which is detected by an acceleration sensor, is a predetermined threshold or more, and further is less than a threshold of the acceleration that is determined as "accident collision".

A determination condition when an event is "security (suspicious person approach)" or "security (vehicle body impact)" is, for example, a case in which the vehicle sensor 3 detects a suspicious person approaching the vehicle 11, or breaking a window glass to steal the vehicle 11.

A determination condition when an event is "automatic break operating time" is, for example, a case in which the vehicle sensor 3 detects that the distance between the vehicle 11 and its preceding vehicle is a predetermined distance or less, and an on-vehicle apparatus, which is separately mounted on the vehicle 11, automatically controls the brakes. A determination condition when an event is "lane-departing time" is, for example, a case in which the vehicle sensor 3 detects lane departure of the vehicle 11.

A determination condition when an event is "vehicle sticking time" is, for example, a case in which the vehicle 11 is stuck on a snowy road, and acceleration is not detected even when an engine is rotated at high speed.

Next, a case in which "storage start" is "manual" will be explained in an example that an event is "drive scenery". For example, when an occupant of an authentication person wants to store and save the scenery during a drive to perform a corresponding predetermined operation by using a switch provided in the drive recorder 1 or the like, the access controller 4b accepts the operation as an event of "drive scenery".

The access controller 4b causes the occupant to select one of giving and removal of a password to/from traveling images of the drive scenery in accordance with information corresponding to "drive scenery", for example, "selection" in "PW presence/absence". The access controller 4b changes between the giving and the removal of the password in accordance with a selection operation of the occupant. Moreover, the access controller 4b sets access limitation, which keeps the traveling images of the drive scenery from being deleted, in accordance with "presence" in "overwriting prevention".

Therefore, in the drive recorder 1 according to the present embodiment, an occupant can set arbitrary access limitation for traveling images. Therefore, for example, the traveling images of the drive scenery can be prevented from being read by another reader without a password, or being erroneously deleted by overwriting.

The event when "record start" is "manual" includes other cases such as "other-vehicle dangerous drive", "other-vehicle traffic offense", and "other-vehicle accident". These enable the occupant to arbitrarily set whether or not to set the access limitation for the traveling images so that another reader can read them afterward, even in such a case that the vehicle 11 of an own vehicle is not in any danger, in other words, urgency is not high. In other words, the occupant can arbitrarily set, in accordance with situations visually recognized by the occupant, the access limitation that indicates, for example, whether or not to set a password for the traveling images of the present situation, or to prevent them from being overwritten.

Next, a case in which "record start" is "automatic" and "manual" will be explained in an example that an event is "other-vehicle rapid approach". When the vehicle sensor 3 detects that the distance between the vehicle 11 and another vehicle that approaches the vehicle 11 is a predetermined distance or less, the access controller 4b executes "record start" in "automatic". In other words, the drive recorder 1 starts recording by using an event detected by the vehicle sensor 3 as a trigger.

In such a case that "record start" is "automatic", the access controller 4b operates by "absence" in "PW presence/absence", in other words, removes a password from the traveling information 5b to be recorded.

In such a case that an occupant getting in the vehicle 11 determines another vehicle approaching the vehicle 11 to be dangerous, and performs a predetermined manual operation to the drive recorder 1, the access controller 4b executes "storage start" in "manual".

In such a case that "record start" is "manual", the access controller 4b operates by "select" in "PW presence/absence", in other words, causes the occupant to select one of giving and removal of the password to/from the traveling images.

The access controller 4b may be, for example, mounted separately on the vehicle 11, and may determine, for example, whether the approaching object is a moving body such as another vehicle, a pedestrian, or a flying object, or a non-moving body such as a fallen object on the road, in accordance with a detection result by a detection device that detects a target approaching the vehicle 11. Subsequently, the access controller 4b determines an event such as "other-vehicle rapid approach", "pedestrian rapid approach", or "fallen/flying object" in accordance with the detection result.

By the way, in such a case that the vehicle 11 is, for example, a rental car or a company car, it may be difficult that the company owning the vehicle 11 manages the traveling information 5b when the access controller 4b sets access limitation in which only the authentication person is accessible.

Therefore, in such a case that an authentication person is an administrator, the access controller 4b gives the authentication person (administrator) an access right corresponding to administrator authority over all of the traveling images. The administrator authority is authority by which privileged functions are executable to the traveling images.

The administrator authority that is given to the administrator by the access controller 4b will be here explained with reference to FIGS. 8A to 8C. FIGS. 8A to 8C are diagrams illustrating administrator authority.

The administrator authority illustrated in FIGS. 8A to 8C is an example, and is not limited thereto. Moreover, authentication persons A and B illustrated in FIGS. 8A to 8C are, for example, the occupants A and B illustrated in FIG. 5. An authentication person C illustrated in FIGS. 8A to 8C is, for example, the reader C illustrated in FIG. 5.

The explanation of FIGS. 8A to 8C is under the assumption that the authentication person A of the identification information 5a illustrated in FIG. 4 is an administrator, the authentication person B is a quasi-administrator, and the authentication person C does not fall under any of the administrator and the quasi-administrator. Moreover, the quasi-administrator has administrator authority that is, for example, inferior to that of the authentication person A that is the administrator, and superior to that of the authentication person C.

As illustrated in FIG. 8A, the access controller 4b gives, for example, the authentication person A that is the administrator an access right by which any traveling information 5b of the authentication persons A, B, and C is available. The access controller 4b gives the authentication person B that is the quasi-administrator an access right by which the traveling information 5b of the authentication persons B and C is available.

As illustrated in FIG. 8B, the access controller 4b gives the authentication person A that is the administrator an access right by which any traveling information 5b of the authentication persons A, B, and C can be deleted. In view of prevention of unauthorized information operations, it is preferable that authority over deletion of the traveling images be given to only the administrator.

As illustrated in FIG. 8C, the access controller 4b gives the authentication person A that is the administrator an access right by which any traveling information 5b of the authentication persons A, B, and C can be transferred to other storage medium or the like. Moreover, the access controller 4b gives each of the authentication persons B and C an access right by which only the traveling information 5b of the corresponding authentication person can be transferred.

By setting the administrator authority as illustrated in FIGS. 8A to 8C, the authentication person A that is the administrator can easily manage the traveling information 5b.

Storage

Return to the explanation referring to FIG. 3, the storage 5 will be explained. The storage 5 is a portable storage medium such as a Secure Digital card (SD card) or a Universal Serial Bus memory (USB memory). Or the storage 5 may be a storage medium such as a semiconductor memory device such as a Random Access Memory (RAM)

or a flash memory, a Hard Disk Drive (HDD), or an optical disk. The storage 5 stores the identification information 5a, the traveling information 5b, and the event information 5c, which are aforementioned.

Display Device

The display device 10 retrieves the traveling information 5b stored in the storage 5, and displays it on the display unit (not illustrated) such as an aforementioned screen. In such a case that the reader reads the traveling information 5b, the display device 10 displays on the display unit an image that requests a password to the reader.

The display device 10 determines whether or not a password that is input by the reader equates to the password having given to the traveling information 5b. When the passwords equate to each other, the display device 10 displays the specified traveling images.

Next, a procedure for recording processes, which is executed by the drive recorder 1 according to the present embodiment, will be explained with reference to FIG. 9. FIG. 9 is a flowchart illustrating the procedure for recording processes that are executed by the drive recorder 1 according to the present embodiment. The procedure illustrated in FIG. 9 is repeated in a predetermined cycle while the drive recorder 1 is in operation.

As illustrated in FIG. 9, the authentication unit 4a executes personal authentication of an occupant on the basis of an ID and a password, which are sent from the portable device P, and an ID and a password, which are included in the identification information 5a stored in the storage 5 (Step S101). It is sufficient that the personal authentication in Step S101 is executed only once immediately after start-up of the drive recorder 1. Next, the capture unit 2 captures outside of the vehicle 11 (Step S102).

Next, the access controller 4b determines whether or not an event occurs, which meets a predetermined condition that indicates at least level of urgency (Step S103). In the determination process, when determining that the event does not occur (Step S103: No), the access controller 4b sets, for the traveling information 5b, access limitation that limits an access from a person other than the occupants (Step S105), and terminates the processes.

On the other hand, in the determination process in Step S103, when determining that the event occurs (Step S103: Yes), the access controller 4b removes the access limitation given to the traveling information 5b (Step S104), and terminates the processes.

Figure 10:
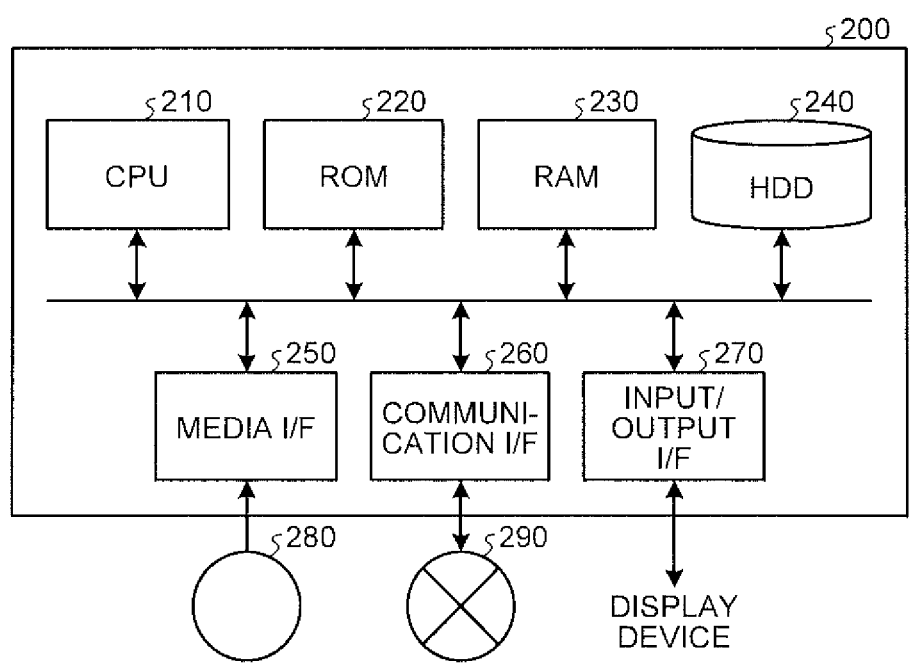
FIG. 10 is a diagram illustrating a hardware configuration example of a computer that realizes functions of the drive recorder.

The drive recorder 1 according to the present embodiment can be realized by a computer 200 whose configuration example is illustrated in FIG. 10. FIG. 10 is a diagram illustrating a hardware configuration example of a computer that realizes functions of the drive recorder 1.

The computer 200 includes a Central Processing Unit (CPU) 210, a Read Only Memory (ROM) 220, a Random Access Memory (RAM) 230, and a Hard Disk Drive (HDD) 240. The computer 200 includes a media interface (I/F) 250, a communication interface (I/F) 260, and an input/output interface (I/F) 270.

The computer 200 may include a Solid State Drive (SSD), and the SSD may execute part or all of the functions of the HDD 240. Moreover, the SSD may be provided instead of the HDD 240.

The CPU 210 operates on the basis of programs stored in at least one of the ROM 220 and the HDD 240, and controls each unit. The ROM 220 stores a boot program that is executed by the CPU 210 at start-up of the computer 200, programs depending on the hardware of the computer 200, etc. The HDD 240 stores programs executed by the CPU 210, data used by the programs, etc.

The media I/F 250 loads programs and data stored in a storage medium 280, and provides them to the CPU 210 using the RAM 230. The CPU 210 loads the programs from the storage medium 280 to the RAM 230 using the media I/F 250, and executes the loaded programs. Or, CPU 210 executes the programs using the data. The storage medium 280 is, for example, a magneto-optical storage medium such as a Digital Versatile Disc (DVD), an SD card, a USB memory, etc.

The communication I/F 260 receives data from other devices using network 290, and sends them to the CPU 210. The communication I/F 260 further sends data generated by the CPU 210 to other devices using the network 290. Or, the communication I/F 260 receives programs from other devices using the network 290, and sends them to the CPU 210. The CPU 210 executes the programs.

The CPU 210 controls, using the input/output I/F 270, a display unit such as a screen and an input unit such as a keyboard, a mouse, or a button. The CPU 210 acquires data from the input unit using the input/output I/F 270. The CPU 210 outputs generated data to the display device 10 using the input/output I/F 270.

For example, in such a case that the computer 200 functions as the drive recorder 1, the CPU 210 of the computer 200 executes programs loaded on the RAM 230, and thus realizes each function of the authentication unit 4a and the access controller 4b.

The CPU 210 of the computer 200 loads, for example, these programs from the storage medium 280, and executes them. As another example, the CPU 210 may acquire these programs from other devices using the network 290. The HDD 240 can store the identification information 5a, the traveling information 5b, and the event information 5c, which are stored in the storage 5.

As described above, the drive recorder 1 according to the present embodiment includes the capture unit 2 and the access controller 4b. The capture unit 2 captures outside of the vehicle 11. The access controller 4b sets the access limitation, which limits an access from a person other than occupants of the vehicle 11, for traveling images of the vehicle 11, which are captured by the capture unit 2 and stored in the storage 5. Moreover, when an event arising from the vehicle 11 meets a predetermined condition that indicates at least level of urgency, the access controller 4b removes the access limitation.

Therefore, by employing the drive recorder 1 according to the present embodiment, a person other than the occupants can read high-urgency traveling images while protecting the personal information.

In the aforementioned embodiment, an example in which the traveling information 5b, which includes traveling images for which access limitation is set, is stored in the portable recording medium M (for example, SD card) that is detachable to the drive recorder 1, however is not limited thereto.

For example, in such a case that the storage medium M is a server apparatus in the cloud computing, the drive recorder 1 further includes a communication unit that can communicate with the server apparatus. The access controller 4b sets or removes access limitation that limits an access from a person other than occupants of the vehicle 11 to or from traveling images of the vehicle 11, and stores them in a storage of the server apparatus using the communication unit.

The display device 10 further includes a communication unit that can communicate with the server apparatus, and acquires the traveling information 5b using the communication unit to display it on a display unit. Therefore, in the display system 100, complicated operations such as readout of the traveling information 5b by an occupant can be avoided. Moreover, the space of a storage device that stores the traveling information 5b can be eliminated.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A non-transitory drive recorder that is provided in a vehicle shared by a plurality of users, the drive recorder comprising:
    a capture unit that includes an image sensor, the image sensor capturing an outside of the vehicle;
    a non-transitory storage unit that stores identification information and sequentially stores traveling images of the vehicle captured by the capture unit, the identification information including identifiers (IDs) of the users and passwords associated with the respective IDs; and
    a processor operatively connected to the storage, the processor configured to:
        determine whether or not an ID and a password that are sent from a terminal device of each of the users that is an occupant of the vehicle equate to an ID and a password that are included in the identification information stored in the storage; and
        set, for each of the users, corresponding access limitation by using a corresponding password of the passwords based on a determination result for corresponding traveling images among the traveling images stored in the storage, the corresponding access limitation allowing the corresponding user to access the corresponding traveling images and limiting an access from a person other than the corresponding user, and,
        when an acceleration sensor provided in the vehicle detects an acceleration of a predetermined threshold or more, a sensor provided in the vehicle detects that a distance between the vehicle and a target object approaching the vehicle is a predetermined threshold or less, or a sensor provided in the vehicle detects lane departure of the vehicle, remove the password set for the traveling images so as to remove the access limitation, the access limitation set for traveling images from a first time point to a second time point among the traveling images stored in the storage unit, the second time point being a time point at which an event meeting a predetermined condition indicating at least a level of urgency arises and the first time point being a time point that is a predetermined time period before the second time point.

2. A non-transitory drive recorder that is provided in a vehicle shared by a plurality of users, the drive recorder comprising:
    a capture unit that includes an image sensor, the image sensor capturing an outside of the vehicle;
    a non-transitory storage unit that stores identification information and sequentially stores traveling images of the vehicle captured by the capture unit, the identification information including identifiers (IDs) of the users and passwords associated with the respective IDs; and
    a processor operatively connected to the storage, the processor configured to:
        determine whether or not an ID and a password that are sent from a terminal device of each of the users that is an occupant of the vehicle equate to an ID and a password that are included in the identification information stored in the storage; and
        set, for each of the users, corresponding access limitation by using a corresponding password of the passwords based on a determination result for corresponding traveling images among the traveling images stored in the storage, the corresponding access limitation allowing the corresponding user to access the corresponding traveling images and limiting an access from a person other than the corresponding user, and,
        when an acceleration sensor provided in the vehicle detects an acceleration of a predetermined threshold or more, a sensor provided in the vehicle detects that a distance between the vehicle and a target object approaching the vehicle is a predetermined threshold or less, or a sensor provided in the vehicle detects lane departure of the vehicle, remove the password set for the traveling images so as to remove the access limitation, the access limitation set for traveling images from a first time point to a second time point among the traveling images stored in the storage unit, the second time point being a time point at which an event meeting a predetermined condition indicating at least a level of urgency arises and the first time point being a time point that is a predetermined time period before the second time point,
    the identification information includes information on an administrator that has administrator authority by which the administrator can perform a privileged function on the traveling images, and
    the processor is configured to give the authentication person an access right corresponding to the administrator authority over all of the traveling images when the authentication person is the administrator.

3. A non-transitory drive recorder that is provided in a vehicle shared by a plurality of users, the drive recorder comprising:
    a capture unit that includes an image sensor, the image sensor capturing an outside of the vehicle;
    a non-transitory storage unit that stores identification information and sequentially stores traveling images of the vehicle captured by the capture unit, the identification information including identifiers (IDs) of the users and passwords associated with the respective IDs; and
    a processor operatively connected to the storage, the processor configured to:
        determine whether or not an ID and a password that are sent from a terminal device of each of the users that is an occupant of the vehicle equate to an ID and a password that are included in the identification information stored in the storage, and
        set, for each of the users, corresponding access limitation by using a corresponding password of the passwords based on a determination result for corresponding traveling images among the traveling images stored in the storage, the corresponding access limitation allowing the corresponding user to access the corresponding traveling images and limiting an access from a person other than the corresponding user, and, when an acceleration sensor provided in the vehicle detects an acceleration of a predetermined threshold or more, a sensor provided in the vehicle detects that a distance between the vehicle and a target object approaching the vehicle is a predetermined threshold or less, or a sensor provided in the vehicle detects lane departure of the vehicle, remove the password set for the traveling images so as to remove the access limitation, the access limitation set for traveling images from a first time point to a second time point among the traveling images stored in the storage unit, the second time point being a time point at which an event meeting a predetermined condition indicating at least a level of urgency arises and the first time point being a time point that is a predetermined time period before the second time point and the processor is configured to accept an operation from the occupant, by which one of setting or removal of the access limitation is selected, and switches between the setting and the removal of the access limitation in accordance with the operation when the event arising from the vehicle is a particular event.

4. A recording method of a drive recorder that is provided in a vehicle shared by a plurality of users, the method comprising:

capturing an outside of the vehicle by using an image sensor;

storing identification information and sequentially storing traveling images of the vehicle captured using the image sensor, the identification information including identifiers (IDs) of the users and passwords associated with the respective IDs;

determining whether or not an ID and a password that are sent from a terminal device of each of the users that is an occupant of the vehicle equate to an ID and a password that are included in the stored identification information;

setting, for each of the users, corresponding access limitation by using a corresponding password of the passwords based on a determination result for corresponding traveling images among the stored traveling images, the corresponding access limitation allowing the corresponding user to access the corresponding traveling images and limiting an access from a person other than the corresponding user, and when an acceleration sensor provided in the vehicle detects an acceleration of a predetermined threshold or more, a sensor provided in the vehicle detects that a distance between the vehicle and a target object approaching the vehicle is a predetermined threshold or less, or a sensor provided in the vehicle detects lane departure of the vehicle, removing the password set for the traveling images so as to remove the access limitation, the access limitation set for traveling images from a first time point to a second time point among the stored traveling images, the second time point being a time point at which an event meeting a predetermined condition indicating at least a level of urgency arises and the first time point being a time point that is a predetermined time period before the second time point.

5. A non-transitory computer-readable medium having stored therein a recording program, the program causing a computer to execute a process comprising:

capturing an outside of a vehicle by using an image sensor;

storing identification information and sequentially storing traveling images of the vehicle captured using the image sensor, the identification information including identifiers (IDs) of the users and passwords associated with the respective IDs;

determining whether or not an ID and a password that are sent from a terminal device of each of the users that is an occupant of the vehicle equate to an II) and a password that are included in the stored identification information;

setting, for each of the users, corresponding access limitation by using a corresponding password of the passwords based on a determination result for corresponding traveling images among the stored traveling images, the corresponding access limitation allowing the corresponding user to access the corresponding traveling images and limiting an access from a person other than the corresponding user, and when an acceleration sensor provided in the vehicle detects an acceleration of a predetermined threshold or more, a sensor provided in the vehicle detects that a distance between the vehicle and a target object approaching the vehicle is a predetermined threshold or less, or a sensor provided in the vehicle detects lane departure of the vehicle, removing the password set for the traveling images so as to remove the access limitation, the access limitation set for traveling images from a first time point to a second time point among the stored traveling images, the second time point being a time point at which an event meeting a predetermined condition indicating at least a level of urgency arises and the first time point being a time point that is a predetermined time period before the second time point.

* * * * *